Sept. 3, 1957 J. NAJJAR 2,804,931
VEHICLE SPEEDOMETER MOUNTING

Filed Sept. 18, 1953 2 Sheets-Sheet 1

J. NAJJAR
INVENTOR.

BY E. C. McRae
J. R. Faulkner
J. H. Oster
ATTORNEYS

Sept. 3, 1957  J. NAJJAR  2,804,931
VEHICLE SPEEDOMETER MOUNTING
Filed Sept. 18, 1953  2 Sheets-Sheet 2

J. NAJJAR
INVENTOR.

BY E. C. McRae
J. R. Faulkner
D. H. Oster
ATTORNEYS

United States Patent Office 2,804,931
Patented Sept. 3, 1957

2,804,931

VEHICLE SPEEDOMETER MOUNTING

John Najjar, Detroit, Mich., assignor to Ford Motor Company, Dearborn, Mich., a corporation of Delaware Application September 18, 1953, Serial No. 381,020

1 Claim. (Cl. 180—90)

This invention relates generally to motor vehicle speedometers, and particularly to speedometer mountings of the adjustable type.

It has been customary to mount vehicle speedometers in a fixed position upon the instrument panel of the vehicle in a location permitting the dial of the speedometer to be viewed by the driver through the vehicle steering wheel. The dial has usually been fixed in a position requiring it to be viewed at somewhat of an angle, depending upon the height of the particular driver. Since drivers vary in height, and since the speedometer dial is often recessed considerably with respect to the surrounding bezel, it would be desirable to so mount the speedometer that the face thereof would be normal to the line of sight of the particular driver operating the vehicle. This advantage is achieved in the present invention by providing a speedometer unit which is a self contained unit separate from the usual fixed instrument panel of the vehicle and which is mounted in such manner as to permit the unit to be adjusted by the operator to align the longitudinal axis of the speedometer with the line of sight of the driver. With this construction all drivers regardless of height can be provided with the maximum visibility inasfar as the speedometer or the speedometer cluster is concerned. The invention also contemplates achieving this adjustability by relatively simple means.

Other objects and advantages of this invention will be made more apparent as this description proceeds, particularly when considered in connection with the accompanying drawings, wherein.

Figure 1:
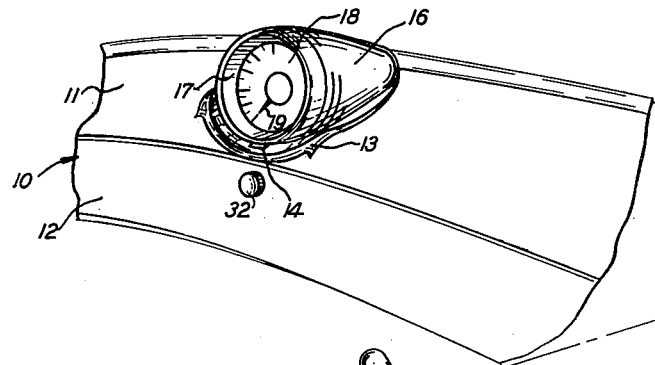
Figure 1 is a fragmentary perspective view of a portion of an instrument panel and speedometer unit of a motor vehicle, incorporating the present invention.
Figure 2:
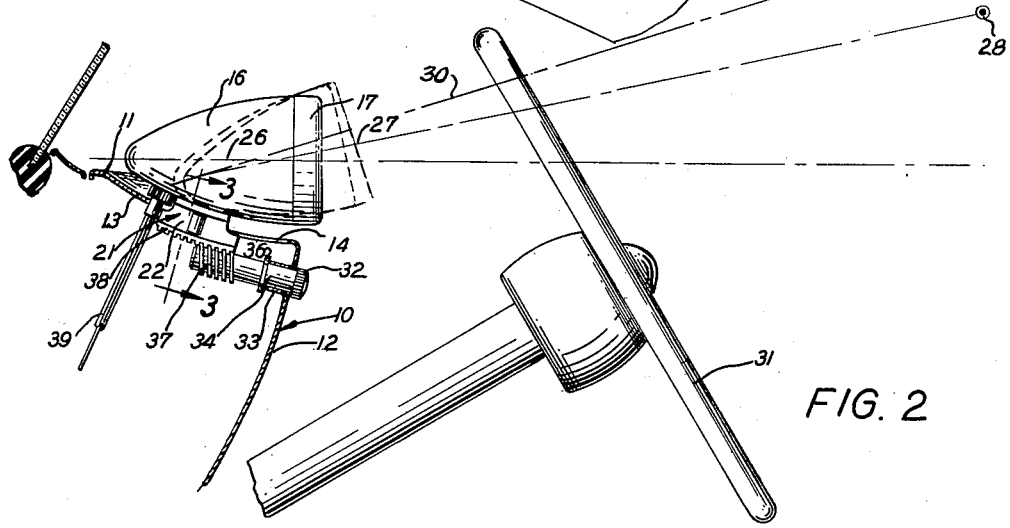
Figure 2 is a cross-sectional view partly in elevation, of the construction shown in Figure 1, taken along a vertical longitudinally extending plane.
Figure 3:
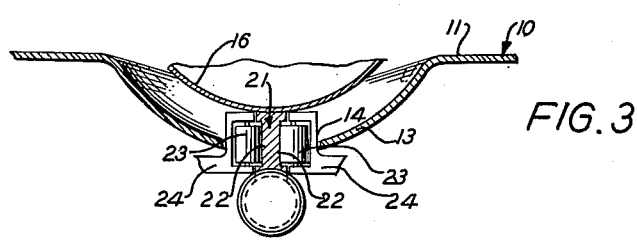
Figure 3 is an enlarged cross-sectional view taken substantially on the line 3—3 of Figure 2.

With reference now to the drawings, and particularly to the modification of the invention shown in Figures 1 to 3 inclusive, the reference character 10 indicates the instrument panel of a motor vehicle. The panel is formed of sheet metal and has generally horizontal portion 11 and a downwardly depending generally vertical portion 12. The generally horizontal portion 11 of the instrument panel is provided with a dished recessed portion 13 generally arcuate in cross-section. The dished portion 13 is provided with a centrally located longitudinally extending slot 14, for a purpose to be described more in detail hereinafter.

The reference character 16 indicates a bullet-shaped housing containing conventional speedometer mechanism (not shown). A bezel 17 is secured to the enlarged end of the housing 16 and retains thereon a dial 18 carrying indicia indicating vehicle speeds. A pointer 19 is mounted centrally of the dial 18. If desired, the housing 16 may contain other vehicle instruments or warning signals in addition to the speedometer to form an instrument cluster.

As best seen in Figures 2 and 3, a guide flange 21 is suitably secured to the underside of the speedometer housing 16 and projects through the slot 14 formed in the upper section 11 of the instrument panel 10. Longitudinally extending grooves 22 are formed on opposite sides of the guide bracket 21 and are engaged by guide rollers 23 rotatably mounted in fixed brackets 24 secured to the instrument panel. If desired, spring means may be incorporated in the mounting of the brackets 24 to urge the rollers 22 toward the guide member 21. It will be apparent that the rollers 23 permit longitudinal adjustment of the guide member 21 and the speedometer housing 16 carried thereby relative to the instrument panel 10. Inasmuch as the lower wall of the dished portion 13 of the upper general horizontal portion 11 of the instrument panel is arcuate, longitudinal adjustment of the speedometer housing effects a tilting thereof. For example, as seen in Figure 2, the speedometer housing may be moved from the position shown in full lines, in which the longitudinal axis 26 thereof is horizontal, to the positions shown in dotted lines in which the longitudinal axes 27 and 30 thereof are inclined upwardly.

As a result of this range of adjustment, the speedometer may be tilted so as to provide the greatest visibility thereof to drivers of various heights. With the speedometer in the full line position of Figure 2, a short driver whose eye point is located at 28 may adjust the speedometer to the dotted position shown so that he will have a line vision along the center line 27 so that he can view the dial 18 of the speedometer in the most advantageous manner, namely at right angles to his line of sight. A taller driver whose eye point is at 29 can by adjusting the speedometer to the other dotted line position shown in Figure 2 likewise achieve the most advantageous view thereof. In each instance it will be seen that the lines of sight extend through the rim 31 of the steering wheel of the vehicle so that the view of the speedometer is not impaired thereby.

Adjustment of the speedometer housing 16 as discussed above is effected by manual manipulation of a control knob 32 located in a convenient position on the instrument panel 10 beneath the speedometer. The generally vertically extending wall 12 of the instrument panel is provided with a sleeve 33 forming a bearing for a shaft 34 having at its outer end the knurled knob 32. A retaining ring 36 cooperates with the knob 32 in preventing longitudinal movement of the shaft relative to the instrument panel. Screw threads 37 are formed along the lower marginal edge of the guide member 21 to effect the adjustment of the speedometer along the arcuate position 13 of the instrument panel upon rotation of the knob.

A conventional flexible speedometer cable 39 extends through the rearward portion of the slot 14 formed in the instrument panel to provide the necessary connection to the speedometer regardless of its adjusted position, yet in such a manner as to be concealed from normal view.

It will be noted that the curvature of the bottom wall of the dished portion of the speedometer housing 16 is substantially the same as the curvature of the portion 13 of the instrument panel. As a result, since the speedometer housing is guided along this arcuate path, it conforms generally to the dished portion of the instrument panel, regardless of its adjusted position, so as to present a satisfactory appearance at all times. In accomplishing this, the speedometer housing is bodily moved in a longitudinal direction when adjusted as well as simultaneously being tilted so as to vary the inclination of the longitudinal axis of the speedometer.

Figure 4:
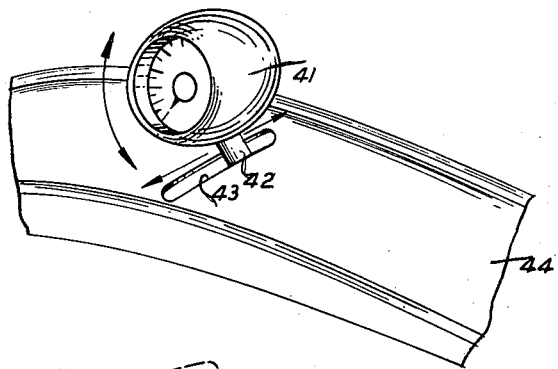
Figure 4 is a fragmentary perspective view of an alternate construction.
Figure 5:
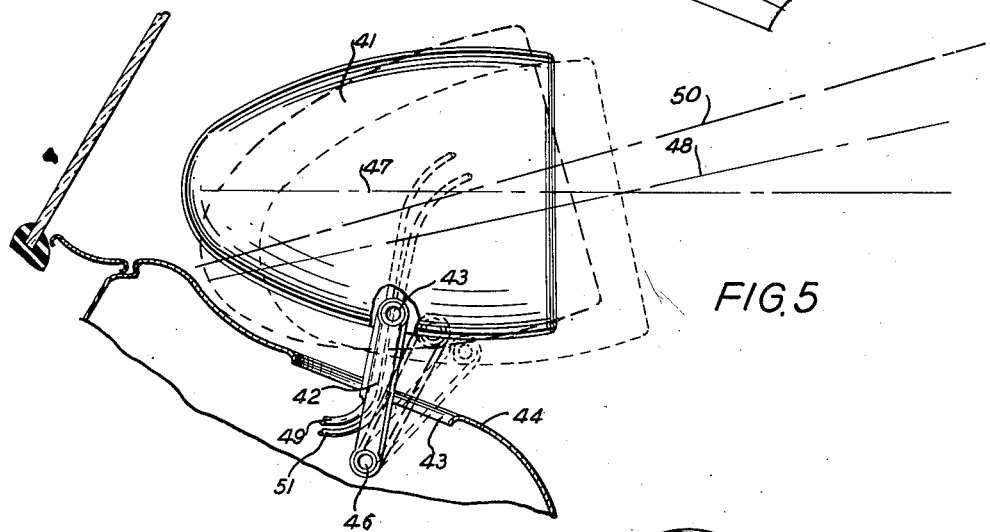
Figure 5 is an enlarged vertical longitudinal cross-view, partly in elevation, of the construction shown in Figure 4.
Figure 6:
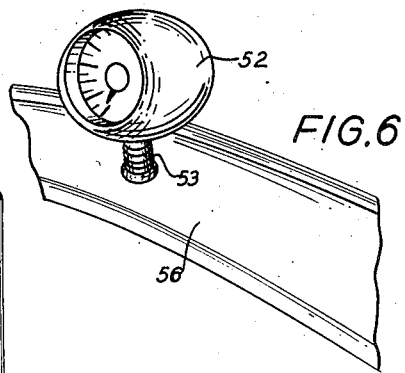
Figure 6 is a fragmentary perspective view of another modification.
Figure 7:
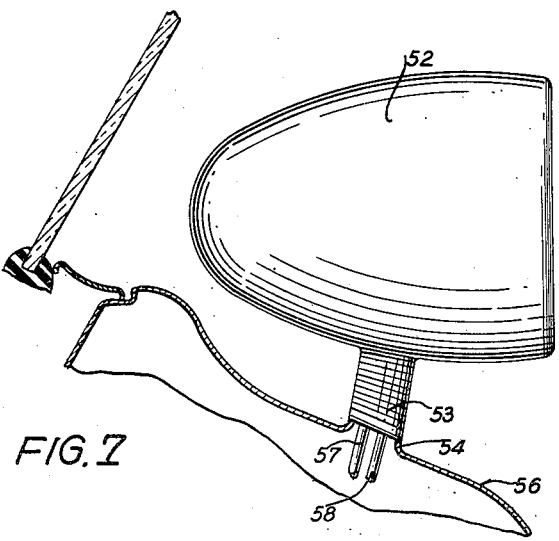
Figure 7 is an enlarged vertical longitudinal cross-sectional view, partly in elevation, of the construction shown in Figure 6.

Figures 4 and 5 illustrate a modification of the invention in which a bullet shaped speedometer housing 41 is mounted upon the upper end of a strut 42 by means of a pivotal connection 43 of the friction type. The strut 42 extends through a longitudinally extending slot 43 formed in the upper wall 44 of the vehicle instrument panel. A pivotal connection 46 of the friction type connects the lower end of the strut 42 to the instrument panel, and it will be apparent that the strut and its pivotal connections to the speedometer and to the instrument permit adjustment of the speedometer throughout the required range.

In the full line position of the speedometer, as shown in Figure 5, the longitudinal center line 47 thereof is horizontal. By grasping the housing 41 of the speedometer, however, the latter may be manually manipulated to vary the position and inclination thereof. For example, in the dotted line positions of the speedometer and strut, as seen in Figure 5, the longitudinal center lines 48 and 50 of the speedometer are inclined upwardly toward the driver of the vehicle to align itself with the line of sight of the driver. Intermediate positions are also readily available. The strut 42 may be of hollow construction so as to house the flexible speedometer cable 49 and the wiring cable 51 to conceal them from view.

It will be seen that this mounting permits the speedometer housing to be bodily moved in a longitudinal direction as well as to be simultaneously tilted so as to vary the inclination of its longitudinal axis. As a result of this combined movement, which can be selected at the will of the operator, the speedometer housing can not only be so adjusted as to be in the proper position for the particular line of sight of the driver but also can be adjusted so that it occupies a position closely adjacent the instrument panel to present a pleasing appearance.

What is claimed is:

In a motor vehicle having an instrument panel provided with a generally horizontal upper wall, said upper wall having a longitudinally extending dished portion formed therein with the bottom wall of said dished portion being arcuate in cross-section in a longitudinal direction and inclined generally downwardly in a direction rearwardly of the vehicle, an elongated bullet-shaped instrument housing having its bottom wall corresponding generally in curvature to the curvature of the bottom wall of the dished portion of the instrument panel and positioned in said dished portion, said dished portion having a longitudinally extending slot formed therein, mounting means for said instrument housing extending through said slot, guiding and supporting means for said instrument housing engaging said mounting means and supporting and guiding the latter for movement in a direction longitudinally of said slot in an arcuate path, and manually operable control means extending through the face of said instrument panel and engageable with said mounting means to move said mounting means and the instrument housing carried thereby longitudinally of the vehicle to bodily move the instrument housing in that direction and also to simultaneously vary the inclination of the longitudinal axis of the instrument housing.

References Cited in the file of this patent

UNITED STATES PATENTS

| | | |
|---|---|---|
| 625,917 | Arnold | May 30, 1899 |
| 1,265,077 | Greenleaf | May 7, 1918 |
| 1,314,704 | Ryder | Sept. 2, 1919 |
| 1,338,781 | Levy | May 4, 1920 |
| 1,552,659 | West | Sept. 8, 1925 |
| 1,802,278 | Schlaich | Apr. 21, 1931 |
| 2,132,168 | Klein et al. | Oct. 4, 1938 |
| 2,165,660 | Snyder et al. | July 11, 1939 |
| 2,667,323 | Mason | Jan. 26, 1954 |

FOREIGN PATENTS

| | | |
|---|---|---|
| 688,358 | Great Britain | Mar. 4, 1953 |